United States Patent
Johannsen et al.

(10) Patent No.: US 7,347,513 B2
(45) Date of Patent: Mar. 25, 2008

(54) CARTRIDGE ASSEMBLY FOR A TRACK CHAIN OF A TRACK TYPE MACHINE AND MACHINE USING SAME

(75) Inventors: Eric J Johannsen, East Peoria, IL (US); Mark S. Diekevers, Metamora, IL (US); Michael D. Hasselbusch, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 186 days.

(21) Appl. No.: 11/156,377

(22) Filed: Jun. 20, 2005

(65) Prior Publication Data

US 2006/0284485 A1  Dec. 21, 2006

(51) Int. Cl.
  *B62D 55/21* (2006.01)
(52) U.S. Cl. ............ 305/203; 305/104; 305/105; 305/106
(58) Field of Classification Search ........... 305/103, 305/104, 105, 106, 200, 202, 203, 204, 100
  See application file for complete search history.

(56) References Cited

U.S. PATENT DOCUMENTS

| | | | |
|---|---|---|---|
| 3,492,054 A * | 1/1970 | Boggs et al. ............ 305/103 |
| 3,601,454 A | 8/1971 | Reinsma | |
| 5,183,318 A * | 2/1993 | Taft et al. .............. 305/185 |
| 6,382,742 B1 * | 5/2002 | Hasselbusch et al. ...... 305/102 |
| 6,386,651 B1 * | 5/2002 | Gerardin et al. ........ 305/100 |
| 6,485,116 B1 * | 11/2002 | Oertley ................ 305/200 |
| 6,486,051 B1 * | 11/2002 | Sabin et al. ............ 438/612 |
| 6,739,680 B2 * | 5/2004 | Hasselbusch et al. ...... 305/202 |
| 6,783,196 B2 * | 8/2004 | Maguire et al. .......... 305/186 |
| 6,846,051 B2 | 1/2005 | Bottom et al. | |
| 2004/0036353 A1 | 2/2004 | Hasselbusch et al. | |
| 2004/0114993 A1 | 6/2004 | Anderton et al. | |

OTHER PUBLICATIONS

Patent Abstracts of JA vol. 2000 #24 of May 11, 2002 & JP 2001 199373 of Jul. 24, 2001 Hitachi Constr. Mach. Co. Ltd.

* cited by examiner

*Primary Examiner*—Russell D. Stormer
*Assistant Examiner*—Kip Kotter
(74) *Attorney, Agent, or Firm*—Liell & McNeil

(57) ABSTRACT

A cartridge bearing assembly for a track chain of a track type work machine is provided. The cartridge bearing assembly includes axial/radial load bearing insert members positioned about a pin, and a rotatable bushing positioned therebetween. Crowned sleeve bearings are disposed between the insert members and the pin, as well as between the pin and the rotatable bushing. Collars are disposed at opposite ends of the pin and fixedly coupled thereto, trapping the other components of the cartridge assembly therebetween. A method of operating a track type work machine is further provided, including reducing wear between coupled track links by reacting axial loads via insert members positioned about a track pin.

19 Claims, 3 Drawing Sheets

CARTRIDGE ASSEMBLY FOR A TRACK CHAIN OF A TRACK TYPE MACHINE AND MACHINE USING SAME

TECHNICAL FIELD

The present disclosure relates generally to track type work machines, and relates more particularly to a rotatable bushing cartridge assembly for a track chain of a track type work machine having first and second insert members with annular load transmitting tabs positioned about a cartridge pin.

BACKGROUND

Track type work machines are typically employed in construction, mining, oil and gas, forestry and in other rugged operating environments. Rather than wheels, such work machines utilize tracks disposed one on each side of a work machine body, and consisting of a chain of coupled links which typically extend about a drive sprocket and one or more idlers. The tracks or "track chains" engage the ground and enable the work machine to move about over relatively rough terrain.

The track chains themselves typically include movable metal links coupled together. Over the course of many hours of operation, the constant metal to metal contact of the moving track chain components can result in significant wear, even where bearings and lubricating oil are used to reduce friction among the components. Galling and other wear related problems tend to be particularly prevalent with relatively large track type work machines, which may subject the track chain components to substantial loads. In some instances, large loads may actually cause the pins supporting the track chain bearings to flex, compounding wear problems by imparting a disproportionate load to isolated regions of the bearing assembly, and thereby causing acute wear. Loads tending to urge the bearing assembly pin or portions of the track sideways relative to a work machine travel direction are known in the art as side loads, and have heretofore been especially difficult to manage. Side loads can actually cause adjacent portions of the track links to grind together.

One joint design directed to limiting certain types of wear in a track chain is known from U.S. Pat. No. 6,485,116 to Oertley. Oertley employs sleeve bearings positioned about a pin, and interacting with a central bushing. The sleeve bearings are crowned to assist in directing certain loads toward a center thereof, reducing disproportionate loading. While Oertley represents one successful approach for at least certain load types, there is always room for improvement.

The present disclosure is directed to one or more of the problems or shortcomings set forth above.

SUMMARY OF THE INVENTION

In one aspect, the present disclosure provides a sleeve bearing assembly for a track chain of a track type work machine. The assembly comprises a pin defining an axis, and a rotatable bushing positioned about the pin. A first and a second insert member are further provided, and each positioned on opposite sides of the rotatable bushing. Each of the insert members includes a radial load bearing surface, and an annular tab extending about the pin and having an axial load bearing surface located thereon.

In another aspect, the present disclosure provides a track type work machine. The work machine includes an inner track link and an outer track link. A sleeve bearing assembly is provided and movably couples the inner and outer track links. The sleeve bearing includes a pin defining an axis, and a rotatable bushing positioned about the pin. First and second axial/radial load transmitting insert members are coupled with the inner track link, each including an annular tab extending about the pin.

In still another aspect, a method of operating a track type work machine is provided. The method includes the step of inserting a rotatable bushing sleeve bearing cartridge assembly between an inner track link and an outer track link. The method further includes the step of, reducing wear between the inner track link and the outer track link by reacting axial loads thereon via an inwardly extending annular tab of each of two insert members of the rotatable bushing sleeve bearing cartridge assembly.

DETAILED DESCRIPTION

Figure 1:
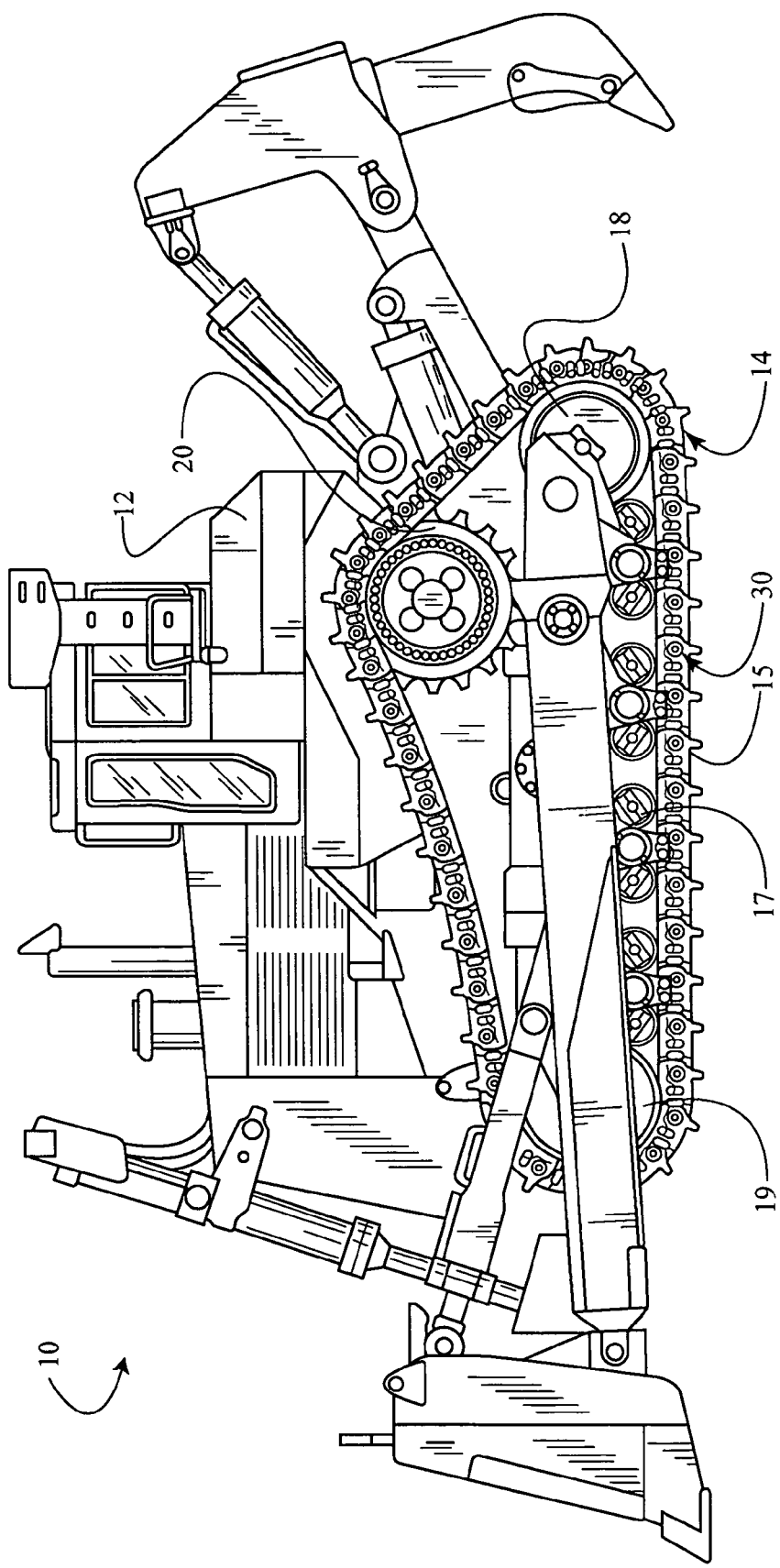
FIG. 1 is a side view of a track type work machine according to the present disclosure.

Referring to FIG. 1, there is shown a track type work machine 10 according to one embodiment of the present disclosure. Work machine 10 includes a work machine body 12, having a drive sprocket 20 mounted to a side thereof. A track chain 14 extends about drive sprocket 20, as well as a rear idler 18 and a front idler 19. Track chain 14 includes a plurality of links 15 movably coupled each one to two others via a sleeve bearing cartridge assembly 30. A plurality of track rollers 17 may be coupled with work machine body 12 and rotate against track chain 14 in a conventional manner. Work machine 10 may include identical track chains, drive sprockets and idlers on opposite sides thereof, in a conventional manner. Work machine 10 is illustrated as a relatively large "high drive" tractor, however, it should be appreciated that the present disclosure is not thereby limited, and any of a wide variety of track type work machines might be designed according to the present disclosure.

Figure 2:
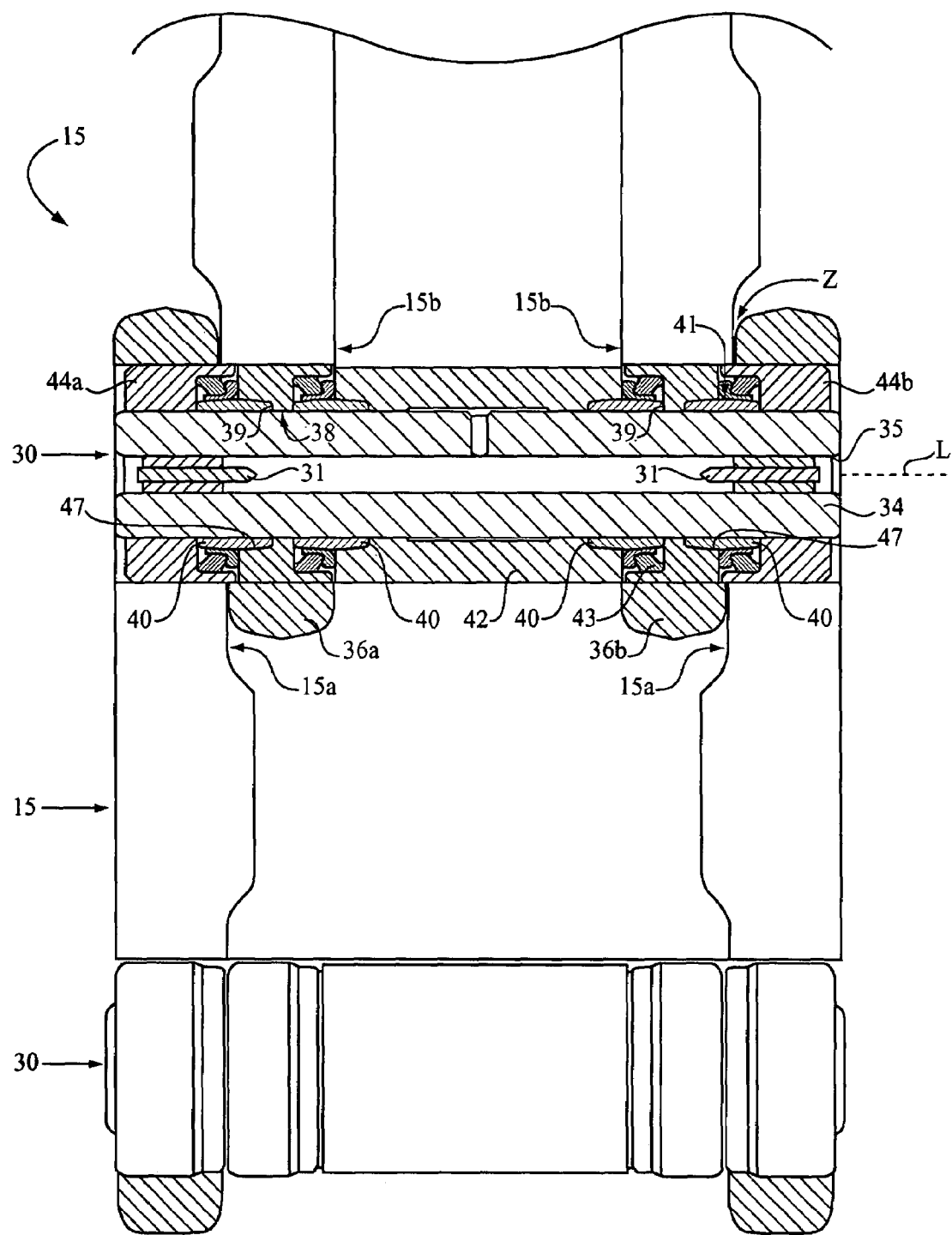
FIG. 2 is an isometric view of a portion of a track chain according to one embodiment of the present disclosure.

Referring to FIG. 2, there is shown a portion of track chain 14, illustrating portions of adjacent and coupled together track links 15. Track links 15 may be identical, with the "inner" and "outer" links described herein representing the links installed in opposite orientations as shown in FIG. 2. A sleeve bearing cartridge assembly 30, hereafter "cartridge assembly 30" movably couples each track link 15 to adjacent track links. In one contemplated embodiment, each cartridge assembly 30 comprises a preassembled, non-serviceable module that may be press fit with adjacent track links, as described herein. Once press fit, certain of the components may be welded together if desired. The various components of cartridge assembly 30 need not be preassembled, however, and might instead be coupled together and with track links 15 upon assembling the entire track chain 14 without departing from the scope of the present disclosure. Moreover, each cartridge assembly 30 need not be press fit with the track links, but instead might be coupled therewith via some other means.

Referring in particular to the sectioned cartridge assembly 30 shown at approximately the center of FIG. 2, cartridge assembly 30 may include a pin 34 defining an axis "L". First and second annular collars, 44a and 44b, respectively, are positioned at one or both ends of pin 34, and may be press fit therewith, as described herein. A bore 35 may be disposed in pin 34 to allow lubricating oil to be provided to the components of cartridge assembly 30. A seal 31 will typically be positioned at one or both ends of bore 35. First and second annular insert members 36a and 36b, respectively, are positioned adjacent and inboard (toward the center of cartridge assembly 30 along axis L) collars 44a and 44b, respectively. A rotatable bushing 42 is positioned between insert members 36a and 36b. In one contemplated embodiment, collars 44a and 44b trap rotatable bushing 42, insert members 36a and 36b, and the other components of cartridge assembly 30 between them when coupled with pin 34. The insert members 36a, 36b, rotatable bushing 42, and thrust rings (described herein) may be slip fit about pin 34. Rotatable bushing 42 will typically rotate against drive sprocket 20 shown in FIG. 1 as track 14 travels about its path during work machine operation, and may also rotate against idlers 18 and 19.

Cartridge assembly 30 of FIG. 2 is illustrated according to one of several possible embodiments of the present disclosure. Each track link 15 will typically be identical, and may include sets of inner links 15b and outer links 15a. Each set of inner and outer links may be coupled with the outer or inner links of an adjacent track link via a cartridge assembly 30. In particular, inner links 15b may be coupled with insert members 36a and 36b, for example press fit therewith, and outer links 15a may be coupled with collars 44a and 44b, also for example press fit therewith. Insert members 36a and 36b may have a slightly larger outer diameter than collars 44a and 44b. Outer links 15a will typically be separated from inner links 15b by a relatively small gap "Z" such that links 15a and 15b may rotate relative to one another during operation without substantially contacting, as described herein.

In the FIG. 2 embodiment, rotatable bushing 42 may be positioned on two sleeve bearings 40. Insert members 36a and 36b may also be positioned on two separate sleeve bearings 40. It is contemplated that each of sleeve bearings 40 may be formed from a relatively hard metallic material, such as nitrided steel, and may include a curvilinear, circumferential crown 41 about a midpoint of the outer diameter thereof. Embodiments are contemplated, however, wherein sleeves 40 include alternative crown geometries or are uncrowned. A plurality of seals 43 may also be provided, and positioned between each of collars 44a and 44b and insert members 36a and 36b, as well as between insert members 36a and 36b and bushing 42. Seals 43 may be annular elastomeric seals similar to the type described in U.S. Pat. No. 6,382,742 to Hasselbusch et al., for example.

Each of insert members 36a and 36b may include an axial bore 47, the respective sleeve members 40 being positioned at least partially within the corresponding axial bore 47. In the embodiment shown in FIG. 2, the outer sleeve bearings 40, supporting insert members 36a and 36b, each extend outward of the respective bores 47 and abut or nearly abut the collar at the corresponding end of cartridge assembly 30. The inner sleeve bearings 40, supporting bushing 42 may extend outwardly from their respective positions between bushing 42 and abut or nearly abut insert members 36a and 36b. The interaction between insert members 36a and 36b, and their corresponding sleeve bearings 40 allow radial loads to be transmitted from inner link straps 15b to insert members 36a, 36b, to sleeve bearings 40 via the inner diameter of each insert member 36a, 36b, and thenceforth to pin 34 from sleeve bearings 40.

Each of crowns 41 allow loads transverse to axis L to be borne relatively uniformly across the interface between each sleeve bearing 40 and pin 34. In other words, each relatively small crown 41 ensures that, even where the "radial" loads include a non-radial vector component, each insert member 36a, 36b will transmit a load predominately to each crown 41 rather than to edge portions of each sleeve bearing 40. The loads which are in turn transmitted to pin 34 via each sleeve bearing 40 will typically be distributed more uniformly across the interface therebetween, avoiding disproportionate wear on either adjacent component. Transmitting of radial loads between bushing 42 and pin 34 via sleeve bearings 40 takes place in a manner similar to that described with respect to radial load transmitting between insert members 36a, 36b and pin 34.

Each of insert members 36a and 36b further includes an annular tab 38 proximate an inboard end of bore 47 that extends inwardly from the corresponding insert member toward pin 34. Each annular tab 38 may further be configured to react axial loads on the respective insert member 36a, 36b in either of an inboard or an outboard direction to the adjacent sleeve bearing 40. Each annular tab 38 may include an axial load transmitting surface 39 on opposite sides thereof. Axial loads may be understood to include such loads on cartridge assembly 30 as are generally aligned with axis L. Those skilled in the art will appreciate, however, that virtually all loads likely to be encountered by cartridge assembly 30 during work machine operation will include both an axial vector component and a radial vector component.

Thus, the respective radial and axial load bearing features of cartridge assembly 30 will typically work in concert. For instance, each annular tab 38 may transmit an axial portion of a load to an adjacent sleeve bearing 40, and each insert member 36a, 36b may transmit a radial portion of a load to the sleeve bearing 40 disposed in the respective bore 47 thereof. Furthermore, depending upon the direction of the load, both a radial component and an axial component thereof may be transmitted initially to the same sleeve bearing 40.

Figure 3:
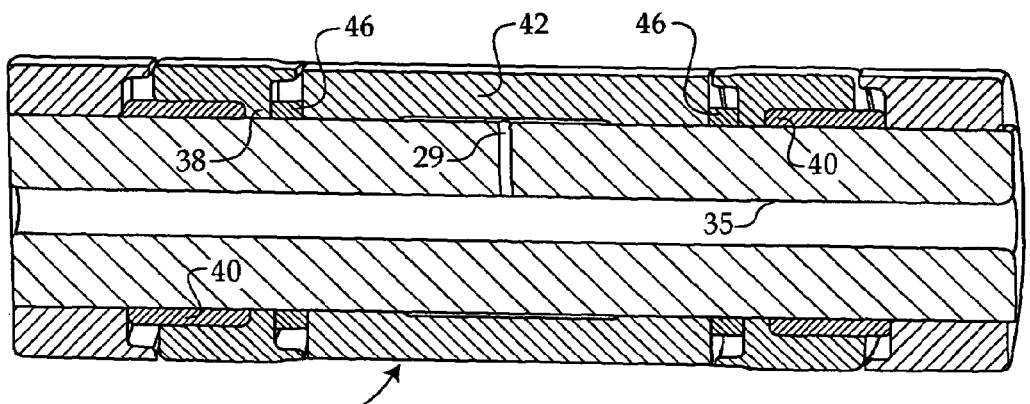
FIG. 3 is a sectioned side view of a rotatable bushing sleeve bearing cartridge assembly according to one embodiment of the present disclosure.

FIG. 3 illustrates another embodiment of a cartridge assembly 230 according to the present disclosure. Cartridge assembly 230 is similar in certain respects to cartridge assembly 330, and like numerals are used therein to identify certain features alike to those illustrated in FIG. 2. It is further contemplated that cartridge assembly 230 might be substituted into track 14 of FIG. 2 for the illustrated cartridge assembly, as might the other bearing assembly embodiments described herein. In contrast to the embodiment of FIG. 2, cartridge assembly 230 does not include sleeve bearings disposed between bushing 42 and pin 34. Rather, bushing 42 includes a substantially constant inner diameter that is similar to the outer diameter of pin 34, and rotates there about. A side bore 29 may be provided in cartridge assembly 230 which connects with axial bore 35, allowing lubricating fluid to be provided between bushing 42 and pin 34. Side bores may be provided in any of the embodiments described herein. A set of annular thrust rings 46 may be positioned on opposite sides of bushing 42 to allow axial loads to be transmitted between annular tabs 38 of insert members 36a and 36b and bushing 42.

Figure 4:
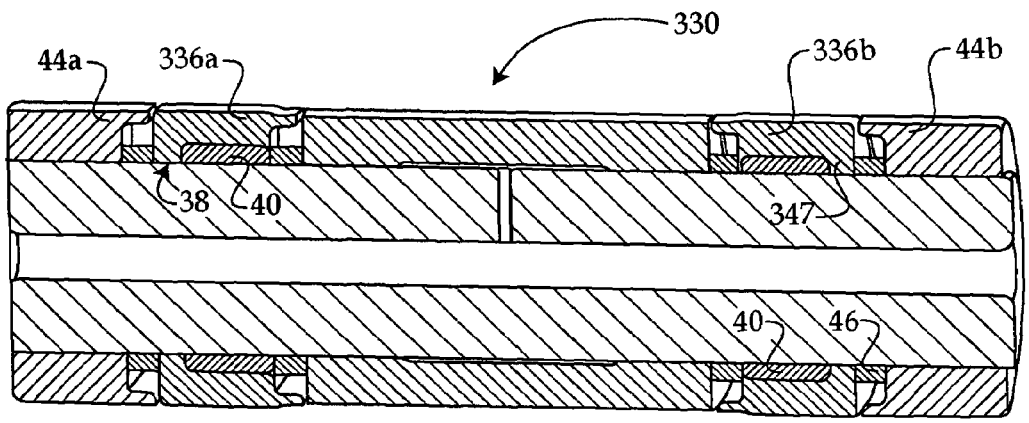
FIG. 4 is a sectioned side view of a rotatable bushing sleeve bearing cartridge assembly according to another embodiment of the present disclosure.

FIG. 4 illustrates yet another embodiment of a cartridge assembly 330 according to the present disclosure. Once again, like numerals are used to identify certain features alike to those described with regard to the foregoing embodiments. Cartridge assembly 330 of FIG. 4 differs from the embodiments of FIGS. 2 and 3, for instance, in that the annular tab 38 of each insert member 336a and 336b is positioned proximate an outboard end of the corresponding axial bore 347. Thrust rings 46 may be disposed between insert members 336a and 336b and collars 44a and 44b, respectively, to transmit axial loads therebetween.

Figure 5:
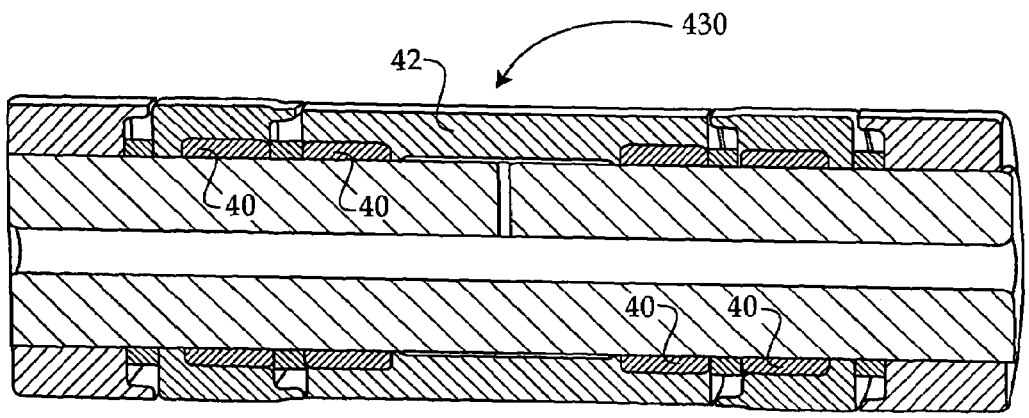
FIG. 5 is a sectioned side view of a rotatable bushing sleeve bearing cartridge assembly according to still another embodiment of the present disclosure.

FIG. 5 illustrates yet another embodiment of a cartridge assembly 430 according to the present disclosure. Cartridge assembly 430 is similar to cartridge assembly 330 of FIG. 4, but differs primarily in that sleeve bearings 40 are also disposed between bushing 42 and pin 34 at opposite ends thereof.

INDUSTRIAL APPLICABILITY

As work machine 10 travels across a work surface, track 14 will travel along its path, about sprocket 20 and idlers 18 and 19. When track 14 encounters a curve in its path, such as when track 14 passes over an uneven surface, or where track 14 passes around sprocket 20 or idlers 18 and 19, the adjacent track links 15 will rotate relative to one another. Referring in particular to FIG. 2, where the adjacent track links rotate, links 15a and 15b will rotate relative to one another. Accordingly, insert members 36a and 36b will rotate about pin 34 relative to collars 44a and 44b. Because collars 44a and 44b are typically fixedly coupled, e.g. press fit, with pin 34 they will remain fixed relative to pin 34.

When track 14 encounters a side load, e.g. where outer link straps 15a are urged in a direction aligned with axis L relative to inner link straps 15b, one of the collars will bear against the immediately adjacent component. For instance, where outer link straps 15a are urged to the left in the FIG. 2 embodiment, the right collar 44b will bear against the immediately adjacent, rightmost sleeve bearing 40. The rightmost sleeve bearing 40 will in turn transmit the axial load to annular tab 38 of insert member 36b, which will in turn transmit the axial load to the immediately adjacent sleeve bearing 40, and so on in a direction aligned with axis L, ultimately to the left collar 44a. Inner links 15b may be similarly urged to one side relative to outer links 15a, in which case a similar process will ensue whereby axial loads are transmitted across cartridge assembly 30. The process of reacting axial loads is much the same in the embodiments of FIGS. 3-5, except that thrust rings 46 will participate in transmitting of the load across the cartridge assembly.

The present disclosure thus provides a bearing assembly, for instance, a cartridge bearing assembly that can better accommodate certain types of loads than many earlier designs. In certain earlier designs, loads were disproportionately distributed, resulting in excessive and/or uneven wear. Worse, in certain designs, the adjacent track links could be forced together by side loads, resulting in undue wear of not only the bearing assembly, but the track links themselves. By providing the described annular, load bearing tabs, axial loads can be effectively transmitted across the assembly. As a result, inner and outer track links are less apt to be forced together and experience resulting wear. Moreover, by incorporating sleeve bearings, in particular crowned sleeve bearings, to support the insert members, radial loads may be transmitted to pin 34 without disproportionately loading edges of the bearing assembly components.

The track links of track 14 will typically wear out before cartridge assembly 30. Part failures or seal leakage can occur, however, and in some instances it will be desirable to replace one or more cartridge assemblies prior to rebuilding the tracks for a given work machine. In such instances, a pulling mechanism or some other means can be used to remove the compromised cartridge assembly from track 14. A new cartridge assembly may then be substituted in its place and the track links once again pressed about the cartridge assembly.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the disclosure. For instance, while it is contemplated that exterior crowns on sleeve bearings 40 may be a practical implementation strategy, still further embodiments may include a crown on the inner diameter of insert members 36a and 36b, and/or on the inner diameter of bushing 42 rather than on the sleeve bearings themselves. Other aspects, features and advantages will be apparent upon an examination of the attached drawing Figures and appended claims.

What is claimed is:

1. A sleeve bearing assembly for a track chain of a track type machine comprising:
   a pin defining an axis;
   a rotatable bushing positioned about said pin;
   a first and a second insert member each positioned on opposite sides of said rotatable bushing, each said insert member including a radial load bearing surface, and an annular tab extending about said pin with an axial load bearing surface located thereon; and
   a first and a second sleeve bearing, said first and second insert members being positioned on said first and second sleeve bearings, respectively, and wherein the radial load bearing surfaces of said insert members contact the corresponding sleeve bearing for transmitting radial loads thereto.

2. The sleeve bearing assembly of claim 1 wherein said first and second sleeve bearings are each positioned adjacent the annular tab of one of said insert members, said annular tabs and said sleeve bearings transmitting axial loads therebetween.

3. The sleeve bearing assembly of claim 2 wherein:
   each of said first and second insert members includes an axial bore; and
   each of said first and second sleeve bearings is positioned at least partially within the axial bore of the corresponding insert member.

4. The sleeve bearing assembly of claim 3 wherein each of said first and second sleeve bearings comprises a curvilinear crown.

5. The sleeve bearing assembly of claim 4 wherein said sleeve bearing assembly comprises a non-serviceable cartridge including first and second collars fixedly coupled at opposite ends of said pin, said collars trapping each said insert member and said rotatable bushing therebetween.

6. The sleeve bearing assembly of claim 5 wherein:
   said first and second sleeve bearings are positioned adjacent said first and second collars, respectively; and
   the annular tab of each said insert member is positioned proximate an inboard end of the corresponding axial bore.

7. The sleeve bearing assembly of claim 6 further comprising third and fourth sleeve bearings disposed at least partially between said pin and said rotatable bushing at opposite ends thereof.

8. The sleeve bearing assembly of claim 5 wherein the annular tab of each of said insert members is positioned proximate an outboard end of the corresponding axial bore.

9. The sleeve bearing assembly of claim 8 further comprising a third and a fourth sleeve bearing each disposed at least partially between said pin and said rotatable bushing at opposite ends thereof.

10. A track type machine comprising:
an inner track link;
an outer track link; and
a sleeve bearing assembly movably coupling said inner and outer track links, said sleeve bearing assembly including a pin defining an axis, a rotatable bushing positioned about said pin, and first and second axial/radial load transmitting insert members coupled with said inner track link, said insert members being positioned on first and second sleeve bearings, respectively, and including radial load bearing surfaces contacting the corresponding sleeve bearing for transmitting radial loads thereto, and each of said insert members further having an annular tab extending about said pin.

11. A track type machine comprising:
an inner track link;
an outer track link; and
a sleeve bearing assembly movably coupling said inner and outer track links, said sleeve bearing assembly including a pin defining an axis, a rotatable bushing positioned about said pin, and first and second axial/radial load transmitting insert members coupled with said inner track link and each having an annular tab extending about said pin;
wherein said sleeve bearing assembly comprises a first and a second sleeve bearing each positioned at least partially between said pin and one of said insert members, each of said insert members being configured to contact the corresponding sleeve bearing at a first location for transmitting radial loads to said pin and at a second location for transmitting axial loads across said sleeve bearing assembly.

12. A track type machine comprising:
an inner track link;
an outer track link; and
a sleeve bearing assembly movably coupling said inner and outer track links, said sleeve bearing assembly including a pin defining an axis, a rotatable bushing positioned about said pin, and first and second axial/radial load transmitting insert members coupled with said inner track link and each having an annular tab extending about said pin;
wherein said sleeve bearing assembly comprises a first and a second sleeve bearing each positioned at least partially between said pin and one of said insert members; and
wherein said sleeve bearing assembly comprises a non-serviceable cartridge assembly including a first and a second collar each disposed at opposite ends of said pin and fixedly coupled with said outer track link, said collars trapping said rotatable bushing and each said insert member therebetween.

13. The track type machine of claim 12 wherein:
the annular tab of each of said first and second insert members comprises an axial load bearing surface adjacent the corresponding sleeve bearing and oriented orthogonal to an outer surface of said pin; and
each of said first and second insert members comprises an axial bore, wherein each respective annular tab extends inwardly proximate one end of the corresponding axial bore.

14. The track type machine of claim 13 wherein each of said first and second sleeve bearings comprises a curvilinear crown.

15. The track type machine of claim 14 wherein said sleeve bearing assembly further comprises a third and a fourth sleeve bearing positioned at least partially between said rotatable bushing and said pin.

16. A method of operating a track type machine comprising the steps of:
inserting a rotatable bushing sleeve bearing cartridge assembly between an inner track link and an outer track link, the cartridge assembly having a pin defining an axis, a rotatable bushing about the pin and first and second insert members positioned about the pin at opposite ends of the rotatable bushing;
reacting non-axial loads between the first and second insert members and the pin through first and second sleeve bearings disposed respectively therebetween at least in part by contacting a radial load bearing surface of each of the insert members with the corresponding sleeve bearing; and
reducing wear between the inner track link and the outer track link by reacting axial loads thereon through an inwardly extending annular tab of each of the two insert members of the rotatable bushing sleeve bearing cartridge assembly.

17. A method of operating a track type machine comprising the steps of:
inserting a rotatable bushing sleeve bearing cartridge assembly between an inner track link and an outer track link, the cartridge assembly having a pin defining an axis, a rotatable bushing about the pin and first and second insert members positioned about the pin at opposite ends of the rotatable bushing
reacting non-axial loads between the first and second insert members and the pin through first and second sleeve bearings disposed respectively therebetween; and
reducing wear between the inner track link and the outer track link by reacting axial loads thereon through an inwardly extending annular tab of each of the two insert members of the rotatable bushing sleeve bearing cartridge assembly;
wherein the wear reducing step further comprises transmitting axial loads on at least one of the inner and outer track links to collars positioned at opposite ends of the pin through each of the inwardly extending annular tabs.

18. The method of claim 17 further comprising the steps of:
prior to the inserting step, assembling the cartridge assembly by slip fitting each of the first and second insert members, the rotatable bushing, and the first and second sleeve bearings about the pin; and
press fitting first and second collars at opposite ends of the pin to trap the first and second insert members, the rotatable bushing and the first and second sleeve bearings therebetween.

19. A method of operating a track type machine comprising the steps of:
  inserting a rotatable bushing sleeve bearing cartridge assembly between an inner track link and an outer track link;
  reducing wear between the inner track link and the outer track link by reacting axial loads thereon through an inwardly extending annular tab of each of two insert members of the rotatable bushing sleeve bearing cartridge assembly;
  prior to the inserting step, assembling the cartridge assembly via slip fitting each of the first and second insert members, a rotatable bushing, and first and second sleeve bearings about a pin; and
  press fitting first and second collars at opposite ends of the pin to trap the first and second insert members, the rotatable bushing and the first and second sleeve bearings therebetween;
  wherein the wear reducing step further comprises transmitting axial loads on at least one of the inner and outer track links to at least one of the collars through each of the inwardly extending annular tabs; and
  wherein the assembling step further comprising slip fitting third and fourth sleeve bearings at least partially between the rotatable bushing and the pin.

* * * * *